United States Patent
Han et al.

(10) Patent No.: US 12,417,371 B2
(45) Date of Patent: Sep. 16, 2025

(54) OPTIMAL CONTROL METHOD FOR WASTEWATER TREATMENT PROCESS BASED ON SELF-ADJUSTING MULTI-TASK PARTICLE SWARM OPTIMIZATION

(71) Applicant: BEIJING UNIVERSITY OF TECHNOLOGY, Beijing (CN)

(72) Inventors: Honggui Han, Beijing (CN); Xing Bai, Beijing (CN); Ying Hou, Beijing (CN); Hongyan Yang, Beijing (CN); Junfei Qiao, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 860 days.

(21) Appl. No.: 17/678,949

(22) Filed: Feb. 23, 2022

(65) Prior Publication Data
US 2022/0383062 A1     Dec. 1, 2022

(30) Foreign Application Priority Data

May 20, 2021 (CN) .......................... 202110554384.1

(51) Int. Cl.
*G06N 3/006* (2023.01)
*G05B 19/05* (2006.01)

(52) U.S. Cl.
CPC .......... *G06N 3/006* (2013.01); *G05B 19/054* (2013.01); *G05B 19/056* (2013.01); *G05B 2219/1134* (2013.01); *G05B 2219/1161* (2013.01)

(58) Field of Classification Search
None
See application file for complete search history.

(56) References Cited

U.S. PATENT DOCUMENTS

| | | | | |
|---|---|---|---|---|
| 7,413,654 B2* | 8/2008 | Applegate | ............... | C02F 3/006 |
| | | | | 210/605 |
| 8,364,612 B2* | 1/2013 | Van Gael | ............... | G06N 20/00 |
| | | | | 706/12 |
| 8,883,943 B2* | 11/2014 | Wu | ......................... | C08F 10/10 |
| | | | | 526/197 |
| 9,747,544 B2* | 8/2017 | Wan | ......................... | C02F 3/30 |
| 11,339,067 B2* | 5/2022 | Van Dijk | ................ | C02F 3/302 |
| 11,530,139 B2* | 12/2022 | Han | ........................ | G06N 20/10 |
| 12,105,075 B2* | 10/2024 | Han | ........................ | G06N 3/08 |
| 12,221,370 B2* | 2/2025 | Peng | ...................... | C02F 3/341 |
| 2014/0091035 A1* | 4/2014 | Regmi | ................... | C02F 3/301 |
| | | | | 210/96.1 |

(Continued)

*Primary Examiner* — Maikhanh Nguyen
(74) *Attorney, Agent, or Firm* — J.C. PATENTS

(57) ABSTRACT

An optimal control method for wastewater treatment process (WWTP) based on a self-adjusting multi-task particle swarm optimization (SA-MTPSO) algorithm belongs to the field of WWTP. To balance the relationship between the effluent water quality (EQ) and energy consumption (EC) and achieve optimization online quickly, the invention establishes a data-based multi-task optimization model for WWTP to describe the relationship between the control variables and EQ, EC. Then, the SA-MTPSO algorithm is adopted to solve the optimal set-points of the nitrate nitrogen and dissolved oxygen concentration for WWTP. The PID controller is used to track the optimal set-points, so as to reduce EC while ensuring EQ, and realize the online optimal control of WWTP.

1 Claim, 2 Drawing Sheets

(56) References Cited

U.S. PATENT DOCUMENTS

| | | | |
|---|---|---|---|
| 2016/0123949 A1* | 5/2016 | Han | G06N 3/088 |
| | | | 702/25 |
| 2019/0359510 A1* | 11/2019 | Han | C02F 1/586 |
| 2020/0024168 A1* | 1/2020 | Han | G06F 30/27 |
| 2020/0087181 A1* | 3/2020 | Van Dijk | C02F 3/1205 |
| 2020/0385286 A1* | 12/2020 | Han | G06Q 50/06 |
| 2022/0112108 A1* | 4/2022 | Han | C02F 3/006 |
| 2023/0004780 A1* | 1/2023 | Han | G06N 3/08 |

* cited by examiner

OPTIMAL CONTROL METHOD FOR WASTEWATER TREATMENT PROCESS BASED ON SELF-ADJUSTING MULTI-TASK PARTICLE SWARM OPTIMIZATION

CROSS-REFERENCE TO RELATED APPLICATION

This application claims the priority benefits to Chinese Patent Application No. 202110554384.1 filed on May 20, 2021, the content of which is hereby incorporated by reference in its entirety.

TECHNOLOGY AREA

The invention relates to an optimal control method for wastewater treatment process based on the self-adjusting multi-task particle swarm optimization algorithm. First, a multi-task optimization model is established by using the data-driven method to obtain the multi-task optimization objective function of wastewater treatment process. Second, the self-adjusting multi-task particle swarm optimization algorithm is adopted to solve the optimal set-points of the nitrate nitrogen and the dissolved oxygen. Finally, PID controller is used to track the optimal set-points, so as to reduce energy consumption while ensuring the quality of effluent water and realize the online optimal control of wastewater treatment process.

TECHNOLOGY BACKGROUND

With the acceleration of China's urbanization process, water pollution is becoming increasingly prominent, especially the phenomenon of excessive effluent quality and high operation cost. As the key to improve the operation effect and efficiency of municipal wastewater treatment, the optimal control strategy has become an important choice for municipal wastewater treatment plants.

The operation mechanism of wastewater treatment process is complex, and the effluent quality and energy consumption of operation indicators have strong conflict, which makes it difficult to realize online optimal control of wastewater treatment process. Therefore, it is an important research issue to balance the relationship between effluent quality and energy consumption and realize online quick solution of optimal set-points. In the process of establishing the model of effluent quality and energy consumption, it is difficult to determine the mechanism model due to the complexity of wastewater treatment process. Therefore, it is of great significance to adopt the data-based modeling approach for accurately describing the optimization objective of wastewater treatment process. In addition, it takes a long time to solve the optimization set-points, which cannot realize the online optimal control of wastewater treatment process. Therefore, the reasonable optimization method for online optimal control can not only reduce energy consumption while ensuring effluent quality, but also is the key to the stable and efficient operation of wastewater treatment process.

The invention designs an optimal control method for wastewater treatment process based on a self-adjusting multi-task particle swarm optimization algorithm. A data-based multi-task optimization model of wastewater treatment process is established, and the self-adjusting multi-task particle swarm optimization algorithm is adopted to solve the optimal set-points of the nitrate nitrogen and the dissolved oxygen, and the PID controller is used to track the optimal set-points.

SUMMARY

The invention won an optimal control method for wastewater treatment process based on a self-adjusting multi-task particle swarm optimization algorithm. The method includes establishing a multi-task optimization model based on data for wastewater treatment process, adopting the self-adjusting multi-task particle swarm optimization algorithm to solve the optimal set-points of nitrate nitrogen and dissolved oxygen, and using PID controller to track the optimal set-points. Thus, under the condition of ensuring effluent quality, energy consumption can be reduced and the online optimal control of wastewater treatment process can be realized.

The above method includes the following steps:
1. An optimal control method for wastewater treatment process based on a self-adjusting multi-task particle swarm optimization algorithm, comprising the following steps:
   (1) collect the process data: the dissolved oxygen is an important indicator of the reaction nitrification process, which is mainly detected by detection instrument of dissolved oxygen; the nitrate nitrogen determines the process of denitrification rate, which is mainly detected by detection instrument of nitrate nitrogen; and the data will be transmitted to programmable logic controller by fieldbus; the programmable logic controller converts the signal into digital or analog quantity and communicates with the master computer through transmission protocol; the master computer obtains real-time data from the wastewater treatment process and stores the collected data in Structured Query Language server database;
   (2) design the data-based multi-task optimization model for wastewater treatment process: the multi-task optimization model for wastewater treatment process adopts data-based method to describe the relationship between optimization set-points and effluent quality, energy consumption, including the objective task model based on the kernel function and the auxiliary task model based on the polynomial regression;
   ① establish the objective task model of effluent quality and energy consumption based on the kernel function:

$$f_1(t) = B_1(t) + \sum_{z=1}^{10} W_{1,z}(t) H_{1,z}(t) \qquad (1)$$

$$f_2(t) = B_2(t) + \sum_{z=1}^{10} W_{2,z}(t) H_{2,z}(t) \qquad (2)$$

where $f_1(t)$ is the objective task model of effluent quality at time t, and $f_2(t)$ is the objective task model of energy consumption at time t; $B_1(t)$ is the output offset of $f_1(t)$ at time t, within $[-2, 2]$, $B_2(t)$ is the output offset of $f_2(t)$ at time t, within $[-2, 2]$; $W_{1,z}(t)$ is the weight of the zth kernel function of $f_1(t)$ at time t, within $[-3, 3]$, $W_{2,z}(t)$ is the weight of the zth kernel function of $f_2(t)$ at time t, within $[-3, 3]$; $H_{1,z}(t)$ is the kernel functions related to $f1(t)$ for wastewater treatment process, and $H_{2,z}(t)$ is the kernel functions related to $f_2(t)$ for wastewater treatment process:

$$H_{1,z}(t) = e^{-\|x(t) - c_{1,z}(t)\|^2 / 2 s_{1,z}(t)^2} \qquad (3)$$

$$H_{2,z}(t) = e^{-\|x(t) - c_{2,z}(t)\|^2 / 2 s_{2,z}(t)^2} \qquad (4)$$

where $x(t)=[S_{NO}(t), S_O(t)]$ is the input variable at time t, $S_{NO}(t)$ is the anaerobic end nitrate nitrogen concentration by detection instrument of dissolved oxygen at time t, within [0, 2], unit: mg/L, and $S_O(t)$ is the concentration of dissolved oxygen at the aerobic terminal by detection instrument of nitrate nitrogen at time t, within [0, 3], unit: mg/L; T is the transpose of a vector or a matrix; $c_{1,z}(t)=[c_{1,z,1}(t), c_{1,z,2}(t)]^T$ is the center of the zth kernel function of $f_1(t)$, and the value ranges of $c_{1,z,1}(t)$ and $c_{1,z,2}(t)$ are [−1,1], $c_{2,z}(t)=[c_{2,z,1}(t), c_{2,z,2}(t)]^T$ is the center of the zth kernel function of $f_2(t)$, and the value ranges of $c_{2,z,1}(t)$ and $c_{2,z,2}(t)$ are [−1,1]; $\sigma_{1,z}(t)$ is the width of the zth kernel function of $f_1(t)$ at time t, within [0, 2], $\sigma_{2,z}(t)$ is the width of the zth kernel function of $f_2(t)$ at time t, within [0, 2];

② train the parameters c(t), σ(t) and W(t) of the objective task model for wastewater treatment process:

$$c(t+1) = c(t) - \alpha_1 \frac{\partial e_{1u}(t)}{\partial c(t)} \quad (5)$$

$$\sigma(t+1) = \sigma(t) - \alpha_2 \frac{\partial e_{1u}(t)}{\partial \sigma(t)} \quad (6)$$

$$W(t+1) = W(t) - \alpha_3 \frac{\partial e_{1u}(t)}{\partial W(t)} \quad (7)$$

where $c(t)=[c_{1,z}(t), c_{2,z}(t)]$ is the center of the kernel function for the objective task model at time t, and $c(t+1)=[c_{1,z}(t+1), c_{2,z}(t+1)]$ is the center of the kernel function for the objective task model at time (t+1); $\sigma(t)=[\sigma_{1,z}(t), \sigma_{2,z}(t)]$ is the width of the kernel function for the objective task model at time t, and $\sigma(t+1)=[\sigma_{1,z}(t+1), \sigma_{2,z}(t+1)]$ is the width of the kernel function for the objective task model at time (t+1); $W(t)=[W_{1,z}(t), W_{2,z}(t)]$ is the weight of the kernel function for the objective task model at time t, and $W(t+1)=[W_{1,z}(t+1), W_{2,z}(t+1)]$ is the weight of the kernel function for the objective task model at time (t+1); $\alpha_1$ is the learning rate of the kernel function center for the objective task model within [0, 1], $\alpha_2$ is the learning rate of the kernel function width for the objective task model within [0, 1], $\alpha_3$ is the learning rate of the kernel function weight for the objective task model within [0, 1]; $e_{1u}(t)=y_1(t)-y_u(t)$ is the prediction error of the objective task model at time t, $y_1(t)=[f_1(t), f_2(t)]$ is the output of the objective task model at time t, $y_u(t)=[EQ(t), EC(t)]$ is the actual output value of wastewater treatment process at time t, EQ(t) is the actual effluent quality value of wastewater treatment process at time t, EC(t) is the actual energy consumption value of wastewater treatment process at time t;

③ establish the auxiliary task model of effluent quality and energy consumption in wastewater treatment process based on the polynomial regression:

$$f_3(t) = b_1(t) + \sum_{q=0}^{2} A_{1,q}(t)(x(t))^q \quad (8)$$

$$f_4(t) = b_2(t) + \sum_{q=0}^{2} A_{2,q}(t)(x(t))^q \quad (9)$$

where $f_3(t)$ is the auxiliary task model of effluent quality at time t, and $f_4(t)$ is the auxiliary task model of energy consumption at time t; $b_1(t)$ is the output offset of $f_3(t)$ at time t, within [−2, 2], $b_2(t)$ is the output offset of $f_4(t)$ at time t, within [−2, 2]; $A_{1,q}(t)$ is the qth coefficient of $f_3(t)$ at time t, within [−3, 3], $A_{2,q}(t)$ is the qth coefficient of $f_4(t)$ at time t, within [−3, 3];

④ train the polynomial coefficient A(t) of the auxiliary task model for wastewater treatment process:

$$A(t+1) = A(t) - \alpha_4 \frac{\partial e_{2u}(t)}{\partial A(t)} \quad (10)$$

where $A(t)=[A_{1,q}(t), A_{2,q}(t)]$ is the polynomial coefficient of the auxiliary task model for wastewater treatment process at time t, and $A(t+1)=[A_{1,q}(t+1), A_{2,q}(t+1)]$ is the polynomial coefficient of the auxiliary task model for wastewater treatment process at time (t+1); $\alpha_4$ is the learning rate of polynomial coefficient for the auxiliary task model within [0, 1]; $e_{2u}(t)=y_2(t)-y_u(t)$ is the prediction error of the auxiliary task model at time t, and $y_2(t)=[f_3(t), f_4(t)]$ is the output of the auxiliary task model at time t;

⑤ establish the multi-task optimization model for wastewater treatment process:

$$\text{minimize } F(t) = [F_1(t), F_2(t)] \quad (11)$$

$$\begin{cases} F_1(t) = [f_1(t), f_2(t)] \\ F_2(t) = [f_3(t), f_4(t)] \end{cases} \quad (12)$$

where, F(t) is the multi-task optimization model of wastewater treatment process at time t, $F_1(t)$ is the objective task model of wastewater treatment process at time t, and $F_2(t)$ is the auxiliary task model of wastewater treatment process at time t;

(3) solve the optimal set-points based on self-adjusting multi-task particle swarm optimization embedded in the master computer: through knowledge transfer between the objective task and the auxiliary task, the self-adjusting multi-task particle swarm optimization algorithm achieves accelerated convergence of the objective task;

① set the total iteration times of self-adjusting multi-task particle swarm optimization as $\tau_{max}=500$, the particle swarm size as N=100, the number of tasks as K=2, and initialize the external archive U(0) as empty set;

② the optimization objective of self-adjusting multi-task particle swarm optimization is the data-based multi-task optimization model for wastewater treatment process: min $F(t)=[F_1(t), F_2(t)]$;

③ the position information of particles $x_t(\tau)=[S_{NOt}(\tau), S_{Ot}(\tau)]$ is used as input in τ iteration at time t; the fitness and skill factors of particles are calculated, and the particles are divided into different groups according to the skill factors; the fitness ranking of the particles are carried out;

④ evaluate the validity of knowledge carried by particles:

$$E_t(t) = \frac{\sum_{m=1}^{20} (F_t^m(t) - \bar{F}_t(t))(g_t^m(t) - g_t(t))}{s(F_t(t))s(g_t(t))} \quad (13)$$

where $E_t(\tau)$ is the knowledge validity of the $\tau^{th}$ iteration at time t, $F^m_t(\tau)=[F^m_{1t}(\tau), F^m_{2t}(\tau)]$ is the multi-task optimization fitness of the mth particle in τ iteration at time t, $F^m_{1t}(\tau)$ is the objective task fitness of the mth particle in τ iteration at time t, and $F^m{}_{2t}(\tau)$ is the auxiliary task fitness of the mth particle in $\tau$ iteration at time t; $\overline{F}_t(\tau)=[\overline{F}_{1t}(\tau), \overline{F}_{2t}(\tau)]$ is the mean of fitness for multi-task optimization in $\tau$ iteration at time t, $\overline{F}_{1t}(\tau)$ is the mean of fitness for the objective task in $\tau$ iteration at time t, $\overline{F}_{2t}(\tau)$ is the mean of fitness for the auxiliary task in $\tau$ iteration at time t; $F_t(\tau)=[F_{1t}(\tau), F_{2t}(\tau)]$ is the fitness of multitask optimization in $\tau$ iteration at time t, $F_{1t}(\tau)$ is the fitness of the objective task in $\tau$ iteration at time t, $F_{2t}(\tau)$ is the fitness of the auxiliary task in $\tau$ iteration at time t; $g_t(\tau)$ is the distance between the objective task particle and the global optimal particle of the auxiliary task in $\tau$ iteration at time t, $g^m{}_t(\tau)$ is the distance between the mth objective task particle and the global optimal particle of the auxiliary task in $\tau$ iteration at time t, $\overline{g}_t(\tau)$ is the mean distance between the objective particle and the global optimal particle of the auxiliary task in $\tau$ iteration at time t;

⑤ design the knowledge transfer strategy:

$$p_{tg}^*(t) = \begin{cases} p_{tJ}(t) & E_t(t) \le E_t(t-1) \\ p_{tJ}(t-1) & E_t(t) > E_t(t-1) \end{cases} \quad (14)$$

where $P^*{}_{tg}(\tau)=[p^*{}_{tg,1}(\tau), p^*{}_{tg,2}(\tau)]$ is the knowledge transfer term in $\tau$ iteration at time t, $P_{tJ}(\tau)=[p_{tJ,1}(\tau), p_{tJ,2}(\tau)]$ is the global optimal solution of the auxiliary task in $\tau$ iteration at time t, $P_{tJ}(\tau-1)=[p_{tJ,1}(\tau-1), p_{tJ,2}(\tau-1)]$ is the global optimal solution of the auxiliary task in $(\tau-1)$ iteration at time t, and J is the solution with the highest knowledge validity in the Pareto optimal solution set of the auxiliary task at time t:

$$J=\mathrm{argmin}_{j\in\{1,2,\ldots,M\}}\{E_{tj}(t)\} \quad (15)$$

where $E_{tj}(\tau)$ is the knowledge validity of the Jth particle in the Pareto optimal solution set of the auxiliary task in $\tau$ iteration at time t;

the particle velocity update formula:

$$v_{ti}(t+1)=wv_{ti}(t)+c_1r_1(p_{ti}(t)-x_{ti}(t))+c_2r_2(p_{tg}(t)-x_{ti}(t))+c_3r_3(p^*{}_{tg}(t)-x_{ti}(t)) \quad (16)$$

where $v_{ti}(\tau+1)$ is the velocity of the ith particle in $(\tau+1)$ iteration at time t, and $v_{ti}(\tau)$ is the velocity of the ith particle in $\tau$ iteration at time t, $x_{ti}(\tau+1)$ is the position of the ith particle in $(\tau+1)$ iteration at time t, and $x_{ti}(\tau)$ is the position of the ith particle in $\tau$ iteration at time t, $P_{ti}(\tau)$ is the individual optimal position of the ith particle in $\tau$ iteration at time t, and $P_{tg}(\tau)$ is the global optimal position of the ith particle in $\tau$ iteration at time t; $\omega=0.8$ is the inertia weight; $c_1=0.25$ is the individual experience acceleration constant, $c_2=0.25$ is the social experience acceleration constant, $c_3=0.25$ is the knowledge transfer term acceleration constant; $r_1$ is the individual experience random number within [0, 1], $r_2$ is the social experience random number within [0, 1], $r_3$ is the knowledge transfer item random number within [0, 1];

⑥ by comparing the individual optimal position $P_{ti}(\tau)$ with the solution of the archive $\Phi_t(\tau-1)$ in $\tau$ iteration at time t, the archive $\Phi_t(\tau)$ is updated:

$$\begin{cases} \Phi_t(\tau) = \Phi_t(\tau-1) \cup P_{ti}(\tau) & \text{if } F_1(\varphi_t(\tau-\iota)) \ldots F_1(P_{ti}(\tau)) \\ \Phi_t(\tau) = \Phi_t(\tau-1) & \text{else} \end{cases} \quad (17)$$

$$\iota = 1, 2, \ldots, t-1$$

where $\cup$ is logic relationship "union", $\Phi_t(\tau-1)=[\varphi_t(\tau-1), \varphi_t(\tau-2), \varphi_t(\tau-1), \ldots, \varphi_t(1)]$, $\varphi_t(\tau-\iota)$ is the $\iota$th optimal solution of archives in $\tau$ iteration, $F_1(\varphi_t(\tau-\iota))$ is the objective tasks fitness of $\varphi_t(\tau-\iota)$, $F_1(P_{ti}(\tau))$ is the objective tasks fitness of $P_{ti}(\tau)$;

⑦ judge whether to stop iteration: if the current iteration number $\tau \ge \tau_{max}$, terminate the iteration process and go to step ⑧; otherwise, the iteration number $\tau$ increases by 1 and go back to step ③;

⑧ a solution is randomly selected from the archives $\Phi_t(\tau_{max})$ as the optimal set-points at time t $u^*(t)=[S^*{}_{NO}(t), S^*{}_O(t)]$, where $S^*{}_{NO}(t)$ is the optimal set-point of nitrate nitrogen at time t and $S^*{}_O(t)$ is the optimal set-point of dissolved oxygen at time t;

(4) track control of the optimal set-points: the multivariable proportion integral differential controller is used to track and control the optimal set-points, and the control signal is transmitted to the programmable logic controller though Object Linking and Embedding for Process Control of communication; the analog signal is converted to digital signal through the analog digital converter; the digital signal is transferred to the frequency converter by fieldbus, to control the frequency of oxygen supply pump and reflux pump, and realize the optimal control of effluent water quality and energy consumption for wastewater treatment process;

① proportion integral differential controller performs tracking control on the optimal set-points $S^*{}_{NO}(t)$ and $S^*{}_O(t)$:

$$\Delta u(t) = K_p\left[e(t) + H_I \int_0^t e(t)dt + H_d \frac{de(t)}{dt}\right] \quad (18)$$

where $\Delta u(t)=[\Delta Q_a(t), \Delta K_La(t)]^T$ is the operational variable matrix, $\Delta Q_a(t)$ is the change of the circulating flow, $\Delta K_La(t)$ is the change of the oxygen transfer coefficient in the fifth zone; $K_p$ is the proportional coefficient, $H_I$ is the integral coefficient, $H_d$ is the differential coefficient; $e(t)=y^*(t)-y(t)$ is control error at time t, $y^*(t)=[S^*{}_{NO}(t), S^*{}_O(t)]^T$ is the optimal set-points at time t, $y(t)=[S_{NO}(t), S_O(t)]^T$ is the actual output values at time t;

② adjust the transfer coefficient of the dissolved oxygen and the internal return flow:

$$K_La(t+1)=K_La(t)-\Delta K_La(t) \quad (19)$$

$$Q_a(t+1)=Q_a(t)+\Delta Q_a(t) \quad (20)$$

where $K_La(t+1)$ is the transfer coefficient of dissolved oxygen at time (t+1), $K_La(t)$ is the transfer coefficient of the dissolved oxygen at time t; $Q_a(t+1)$ is the inner return flow at time (t+1), $Q_a(t)$ is the inner return flow at time t; when the frequency of oxygen supply pump and reflux pump is adjusted by frequency converter, the concentration of nitrate nitrogen will be adjusted to $S^*{}_{NO}(t)$ and the concentration of dissolved oxygen will be adjusted to $S^*{}_O(t)$; thus, the optimal control of effluent quality and energy consumption for wastewater treatment process is realized.

The Novelties of this Patent Contain:

(1) Aim at the problem that it is difficult to balance the conflict relationship between effluent quality and energy consumption, and difficult to implement online to solve the optimal value, the invention proposed an optimal control method for wastewater treatment process based on a self-adjusting multi-task particle swarm optimization algorithm. The method includes establishing a multi-task optimization model based on data for wastewater treatment process, adopting the self-adjusting multi-task particle swarm optimization algorithm to solve the optimal set-points of nitrate nitrogen and dissolved oxygen, and using PID controller to track the optimal set-points. Thus, under the condition of ensuring effluent quality, energy consumption can be reduced and the online optimal control of wastewater treatment process can be realized.

(2) The invention adopts the self-adjusting multi-task particle swarm optimization algorithm to solve the optimal set-points of the nitrate nitrogen and the dissolved oxygen. The method evaluates the validity of the knowledge carried by particles and selects the most effective information for knowledge transfer. The self-adjusting mechanism can guide the particle swarm to the position with better convergence, and finally get the optimal set-points faster, which is conducive to realize the optimal control online for wastewater treatment process.

Attention: the invention adopts the data-driven model based on kernel function and polynomial regression to establish the multi-task optimization model, and uses self-adjusting multi-task particle swarm optimization algorithm to optimize the set-points of nitrate nitrogen and dissolved oxygen for wastewater treatment process. Other data-based modeling methods and multi-task optimal control methods based on multi-task particle swarm optimization algorithm should fall within the scope of the invention.

Figure 1:
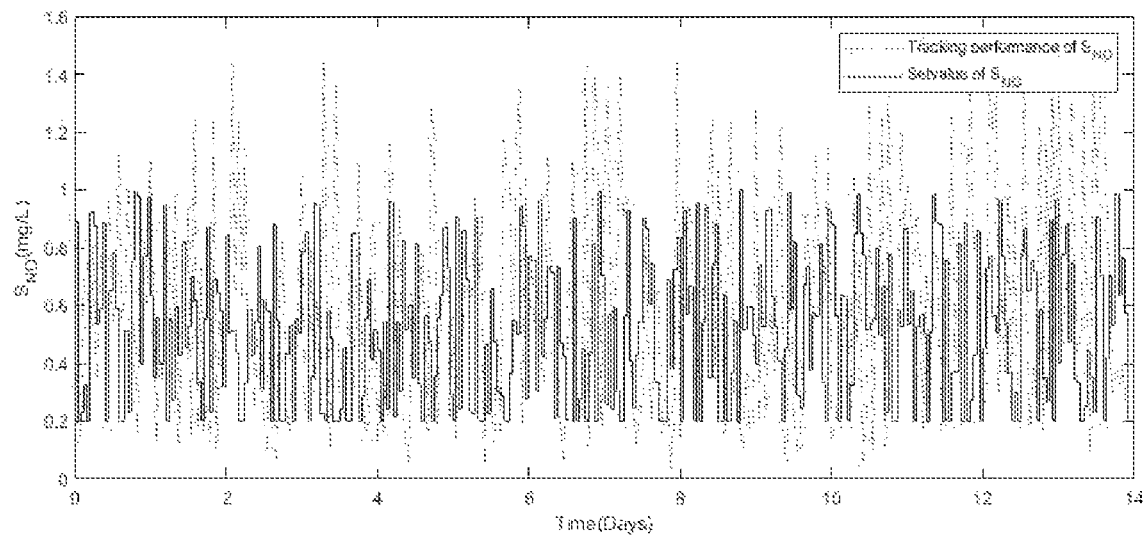
FIG. 1 is the nitrate nitrogen result of the optimal control method.

DETAILED DESCRIPTION OF THE INVENTION (1) collect the process data: the dissolved oxygen is an important indicator of the reaction nitrification process, which is mainly detected by detection instrument of dissolved oxygen; the nitrate nitrogen determines the process of denitrification rate, which is mainly detected by detection instrument of nitrate nitrogen; and the data will be transmitted to programmable logic controller by fieldbus; the programmable logic controller converts the signal into digital or analog quantity and communicates with the master computer through transmission protocol; the master computer obtains real-time data from the wastewater treatment process and stores the collected data in Structured Query Language server database;

(2) design the data-based multi-task optimization model for wastewater treatment process: the multi-task optimization model for wastewater treatment process adopts data-based method to describe the relationship between optimization set-points and effluent quality, energy consumption, including the objective task model based on the kernel function and the auxiliary task model based on the polynomial regression;

① establish the objective task model of effluent quality and energy consumption based on the kernel function:

$$f_1(t) = B_1(t) + \sum_{z=1}^{10} W_{1,z}(t) H_{1,z}(t) \quad (21)$$

$$f_2(t) = B_2(t) + \sum_{z=1}^{10} W_{2,z}(t) H_{2,z}(t) \quad (22)$$

where $f_1(t)$ is the objective task model of effluent quality at time t, and $f_2(t)$ is the objective task model of energy consumption at time t; $B_1(t)$ is the output offset of $f_1(t)$ at time t, within [−2, 2], $B_1(0)=-1.01$, $B_2(t)$ is the output offset of $f_2(t)$ at time t, within [−2, 2], $B_2(0)=0.32$; $W_{1,z}(t)$ is the weight of the zth kernel function of $f_1(t)$ at time t, within [−3, 3], $W_{1,z}(0)=1.8$, $W_{2,z}(t)$ is the weight of the zth kernel function of $f_2(t)$ at time t, within [−3, 3], $W_{2,z}(0)=2.4$; $H_{1,z}(t)$ is the kernel functions related to $f_1(t)$ for wastewater treatment process, and $H_{2,z}(t)$ is the kernel functions related to $f_2(t)$ for wastewater treatment process:

$$H_{1,z}(t) = e^{-\|x(t)-c_{1,z}(t)\|^2 / 2 s_{1,z}(t)^2} \quad (23)$$

$$H_{2,z}(t) = e^{-\|x(t)-c_{2,z}(t)\|^2 / 2 s_{2,z}(t)^2} \quad (24)$$

where $x(t)=[S_{NO}(t), S_O(t)]$ is the input variable at time t, $S_{NO}(t)$ is the anaerobic end nitrate nitrogen concentration by detection instrument of dissolved oxygen at time t, within [0, 2], unit: mg/L, and $S_O(t)$ is the concentration of dissolved oxygen at the aerobic terminal by detection instrument of nitrate nitrogen at time t, within [0, 3], unit: mg/L, $S_O(0)=1.5$ mg/L; T is the transpose of a vector or a matrix; $c_{1,z}(t) = [c_{1,z,1}(t), c_{1,z,2}(t)]^T$ is the center of the zth kernel function of $f_1(t)$, and the value ranges of $c_{1,z,1}(t)$ and $c_{1,z,2}(t)$ are [−1, 1], $c_{1,z,1}(0)=0.76$, $c_{1,z,2}(0)=0.45$, $c_{2,z}(t)=[c_{2,z,1}(t), c_{2,z,2}(t)]^T$ is the center of the zth kernel function of $f_2(t)$, and the value ranges of $c_{2,z,1}(t)$ and $c_{2,z,2}(t)$ are [−1, 1], $c_{2,z,1}(0)=0.82$, $c_{2,z,2}(0)=0.67$; $\sigma_{1,z}(t)$ is the width of the zth kernel function of $f_1(t)$ at time t, within [0, 2], $\sigma_{1,z}(0)=1.72$, $\sigma_{2,z}(t)$ is the width of the zth kernel function of $f_2(t)$ at time t, within [0, 2], $\sigma_{2,z}(0)=0.62$;

② train the parameters $c(t)$, $\sigma(t)$ and $W(t)$ of the objective task model for wastewater treatment process:

$$c(t+1) = c(t) - \alpha_1 \frac{\partial e_{1u}(t)}{\partial c(t)} \quad (25)$$

$$\sigma(t+1) = \sigma(t) - \alpha_2 \frac{\partial e_{1u}(t)}{\partial \sigma(t)} \quad (26)$$

$$W(t+1) = W(t) - \alpha_3 \frac{\partial e_{1u}(t)}{\partial W(t)} \quad (27)$$

where $c(t)=[c_{1,z}(t), c_{2,z}(t)]$ is the center of the kernel function for the objective task model at time t, and $c(t+1)=[c_{1,z}(t+1), c_{2,z}(t+1)]$ is the center of the kernel function for the objective task model at time (t+1); $\sigma(t)=[\sigma_{1,z}(t), \sigma_{2,z}(t)]$ is the width of the kernel function for the objective task model at time t, and $\sigma(t+1)=[\sigma_{1,z}(t+1), \sigma_{2,z}(t+1)]$ is the width of the kernel function for the objective task model at time (t+1); $W(t)=[W_{1,z}(t), W_{2,z}(t)]$ is the weight of the kernel function for the objective task model at time t, and $W(t+1)=[W_{1,z}(t+1), W_{2,z}(t+1)]$ is the weight of the kernel function for the objective task model at time (t+1); $\alpha_1$ is the learning rate of the kernel function center for the objective task model within [0, 1], $\alpha_2$ is the learning rate of the kernel function width for the objective task model within [0, 1], $\alpha_3$ is the learning rate of the kernel function weight for the objective task model within [0, 1]; $e_{1u}(t)=y_1(t)-y_u(t)$ is the prediction error of the objective task model at time t, $y_1(t)=[f_1(t), f_2(t)]$ is the output of the objective task model at time t, $y_u(t)=[EQ(t), EC(t)]$ is the actual output value of wastewater treatment process at time t, EQ(t) is the actual effluent quality value of wastewater treatment process at time t, EC(t) is the actual energy consumption value of wastewater treatment process at time t;

③ establish the auxiliary task model of effluent quality and energy consumption in wastewater treatment process based on the polynomial regression:

$$f_3(t) = b_1(t) + \sum_{q=0}^{2} A_{1,q}(t)(x(t))^q \quad (28)$$

$$f_4(t) = b_2(t) + \sum_{q=0}^{2} A_{2,q}(t)(x(t))^q \quad (29)$$

where $f_3(t)$ is the auxiliary task model of effluent quality at time t, and $f_4(t)$ is the auxiliary task model of energy consumption at time t; $b_1(t)$ is the output offset of $f_3(t)$ at time t, within [−2, 2], $b_1(0)=-1.5$, $b_2(t)$ is the output offset of $f_4(t)$ at time t, within [−2, 2], $b_2(0)=-0.84$; $A_{1,q}(t)$ is the qth coefficient of $f_3(t)$ at time t, within [−3, 3], $A_{1,q}(0)=0.56$, $A_{1,q}(t)$ is the qth coefficient of $f_4(t)$ at time t, within [−3, 3], $A_{2,q}(0)=1.34$;

④ train the polynomial coefficient A(t) of the auxiliary task model for wastewater treatment process:

$$A(t+1) = A(t) - \alpha_4 \frac{\partial e_{2u}(t)}{\partial A(t)} \quad (30)$$

where $A(t)=[A_{1,q}(t), A_{2,q}(t)]$ is the polynomial coefficient of the auxiliary task model for wastewater treatment process at time t, and $A(t+1)=[A_{1,q}(t+1), A_{2,q}(t+1)]$ is the polynomial coefficient of the auxiliary task model for wastewater treatment process at time (t+1); $\alpha_4$ is the learning rate of polynomial coefficient for the auxiliary task model within [0, 1]; $e_{2u}(t)=y_2(t)-y_u(t)$ is the prediction error of the auxiliary task model at time t, and $y_2(t)=[f_3(t), f_4(t)]$ is the output of the auxiliary task model at time t;

⑤ establish the multi-task optimization model for wastewater treatment process:

minimize $F(t) = [F_1(t), F_2(t)]$ (31)

$$\begin{cases} F_1(t) = [f_1(t), f_2(t)] \\ F_2(t) = [f_3(t), f_4(t)] \end{cases} \quad (32)$$

where, F(t) is the multi-task optimization model of wastewater treatment process at time t, $F_1(t)$ is the objective task model of wastewater treatment process at time t, and $F_2(t)$ is the auxiliary task model of wastewater treatment process at time t;

(3) solve the optimal set-points based on self-adjusting multi-task particle swarm optimization embedded in the master computer: through knowledge transfer between the objective task and the auxiliary task, the self-adjusting multi-task particle swarm optimization algorithm achieves accelerated convergence of the objective task;

① set the total iteration times of self-adjusting multi-task particle swarm optimization as $\tau_{max}=500$, the particle swarm size as N=100, the number of tasks as K=2, and initialize the external archive U(0) as empty set;

② the optimization objective of self-adjusting multi-task particle swarm optimization is the data-based multi-task optimization model for wastewater treatment process: min $F(t)=[F_1(t), F_2(t)]$;

③ in τ iteration at time t, the position information of particles $x_t(\tau)=[S_{NOt}(\tau), S_{Ot}(\tau)]$ is used as input; the fitness and skill factors of particles are calculated, and the particles are divided into different groups according to the skill factors; the fitness ranking of the particles are carried out;

④ evaluate the validity of knowledge carried by particles:

$$E_t(\tau) = \frac{\sum_{m=1}^{20}(F_t^m(t) - \overline{F}_t(t))(g_t^m(t) - \overline{g_t}(t))}{s(F_t(t))s(g_t(t))} \quad (33)$$

where $E_t(\tau)$ is the knowledge validity of the τth iteration at time t, $F^m_t(\tau)=[F^m_{1t}(\tau), F^m_{2t}(\tau)]$ is the multi-task optimization fitness of the mth particle in τ iteration at time t, $F^m_{1t}(\tau)$ is the objective task fitness of the mth particle in τ iteration at time t, and $F^m_{2t}(\tau)$ is the auxiliary task fitness of the mth particle in τ iteration at time t; $\overline{F}_t(\tau)=[\overline{F}_{1t}(\tau), \overline{F}_{2t}(\tau)]$ is the mean of fitness for multi-task optimization in τ iteration at time t, $\overline{F}_{1t}(t)$ is the mean of fitness for the objective task in τ iteration at time t, $\overline{F}_{2t}(\tau)$ is the mean of fitness for the auxiliary task in τ iteration at time t; $F_t(\tau)=[F_{1t}(\tau), F_{2t}(\tau)]$ is the fitness of multitask optimization in τ iteration at time t, $F_{1t}(\tau)$ is the fitness of the objective task in τ iteration at time t, $F_{2t}(\tau)$ is the fitness of the auxiliary task in τ iteration at time t; $g_t(\tau)$ is the distance between the objective task particle and the global optimal particle of the auxiliary task in τ iteration at time t, $g^m_t(\tau)$ is the distance between the mth objective task particle and the global optimal particle of the auxiliary task in τ iteration at time t, $\overline{g}_t(\tau)$ is the mean distance between the objective particle and the global optimal particle of the auxiliary task in τ iteration at time t;

⑤ design the knowledge transfer strategy:

$$p^*_{tg}(t) = \begin{cases} p_{tJ}(t) & E_t(t) \le E_t(t-1) \\ p_{tJ}(t-1) & E_t(t) > E_t(t-1) \end{cases} \quad (34)$$

where $P^*_{tg}(\tau)=[p^*_{tg,1}(\tau), p^*_{tg,2}(\tau)]$ is the knowledge transfer term in τ iteration at time t, $P_{tJ}(\tau)=[p_{tJ,1}(\tau), p_{tJ,2}(\tau)]$ is the global optimal solution of the auxiliary task in τ iteration at time t, $P_{tJ}(\tau-1)=[p_{tJ,1}(\tau-1), p_{tJ,2}(\tau-1)]$ is the global optimal solution of the auxiliary task in (τ−1) iteration at time t, and J is the solution with the highest knowledge validity in the Pareto optimal solution set of the auxiliary task at time t:

$$J = \mathrm{argmin}_{j \in \{1,2,\ldots,M\}}\{E_{tj}(t)\} \quad (35)$$

where $E_{tj}(\tau)$ is the knowledge validity of the Jth particle in the Pareto optimal solution set of the auxiliary task in τ iteration at time t;

the particle velocity update formula:

$$v_{ti}(t+1)=wv_{ti}(t)+c_1r_1(p_{ti}(t)-x_{ti}(t))+c_2r_2(p_{tg}(t)-x_{ti}(t))+c_3r_3(p^*_{tg}(t)-x_{ti}(t)) \quad (36)$$

where $v_{ti}(\tau+1)$ is the velocity of the ith particle in (τ+1) iteration at time t, and $v_{ti}(\tau)$ is the velocity of the ith particle in τ iteration at time t, $x_{ti}(\tau+1)$ is the position of the ith particle in (τ+1) iteration at time t, and $x_{ti}(\tau)$ is the position of the ith particle in τ iteration at time t, $P_{ti}(\tau)$ is the individual optimal position of the ith particle in τ iteration at time t, and $P_{tg}(\tau)$ is the global optimal position of the ith particle in τ iteration at time t; ω=0.8 is the inertia weight; $c_1=0.25$ is the individual experience acceleration constant, $c_2=0.25$ is the social experience acceleration constant, $c_3=0.25$ is the knowledge transfer term acceleration constant; $r_1$ is the individual experience random number within [0, 1], $r_2$ is the social experience random number within [0, 1], $r_3$ is the knowledge transfer item random number within [0, 1];

⑥ by comparing the individual optimal position $P_{ti}(\tau)$ in $\tau$ iteration at time t with the solution of the archive $\Phi_t(\tau-1)$ in $\tau$ iteration at time t, the archive $\Phi_t(\tau)$ is updated:

$$\begin{cases} \Phi_t(\tau) = \Phi_t(\tau-1) \cup P_{ti}(\tau) & \text{if } F_1(\varphi_t(\tau-\iota)) \dots F_1(P_{ti}(\tau)) \\ \Phi_t(\tau) = \Phi_t(\tau-1) & \text{else} \end{cases}, \quad (37)$$

$$\iota = 1, 2, \dots, t-1$$

where $\cup$ is logic relationship "union", $\Phi_t(\tau-1)=[\varphi_t(\tau-1), \varphi_t(\tau-2), \varphi_t(\tau-1), \dots, \varphi_t(1)]$, $\varphi_t(\tau-1)$ is the ith optimal solution of archives in $\tau$ iteration, $F_1(\varphi_t(\tau-\iota))$ is the objective tasks fitness of $\varphi_t(\tau-\iota)$, $F_1(P_{ti}(\tau))$ is the objective tasks fitness of $P_{ti}(\tau)$;

⑦ judge whether to stop iteration: if the current iteration number $\tau \geq \tau_{max}$, terminate the iteration process and go to step ⑧; otherwise, the iteration number $\tau$ increases by 1 and go back to step ③;

⑧ a solution is randomly selected from the archives $\Phi_t(\tau_{max})$ as the optimal set-points at time t $u^*(t)=[S^*_{NO}(t), S^*_O(t)]$, where $S^*_{NO}(t)$ is the optimal set-point of nitrate nitrogen at time t and $S^*_O(t)$ is the optimal set-point of dissolved oxygen at time t;

(4) tracking control of the optimal set-points: the multivariable proportion integral differential controller is used to track and control the optimal set-points, and the control signal is transmitted to the programmable logic controller though Object Linking and Embedding for Process Control of communication; the analog signal is converted to digital signal through the analog digital converter; the digital signal is transferred to the frequency converter by fieldbus, to control the frequency of oxygen supply pump and reflux pump, and realize the optimal control of effluent water quality and energy consumption for wastewater treatment process;

① PID controller performs tracking control on the optimal set-points $S^*_{NO}(t)$ and $S^*_O(t)$:

$$\Delta u(t) = K_p \left[ e(t) + H_I \int_0^t e(t)dt + H_d \frac{de(t)}{dt} \right] \quad (38)$$

where $\Delta u(t)=[\Delta Q_a(t), \Delta K_L a(t)]^T$ is the operational variable matrix, $\Delta Q_a(t)$ is the change of the circulating flow, $\Delta K_L a(t)$ is the change of the oxygen transfer coefficient in the fifth zone; $K_p$ is the proportional coefficient, $H_I$ is the integral coefficient, $H_d$ is the differential coefficient; $e(t)=y^*(t)-y(t)$ is control error at time t, $y^*(t)=[S^*_{NO}(t), S^*_O(t)]^T$ is the optimal set-points at time t, $y(t)=[S_{NO}(t), S_O(t)]^T$ is the actual output values at time t;

② adjust the transfer coefficient of the dissolved oxygen and the internal return flow:

$$K_L a(t+1) = K_L a(t) + \Delta K_L a(t) \quad (39)$$

$$Q_a(t+1) = Q_a(t) + \Delta Q_a(t) \quad (40)$$

where $K_L a(t+1)$ is the transfer coefficient of dissolved oxygen at time (t+1), $K_L a(t)$ is the transfer coefficient of the dissolved oxygen at time t; $Q_a(t+1)$ is the inner return flow at time (t+1), $Q_a(t)$ is the inner return flow at time t; when the frequency of oxygen supply pump and reflux pump is adjusted by frequency converter, the concentration of nitrate nitrogen will be adjusted to $S^*_{NO}(t)$ and the concentration of dissolved oxygen will be adjusted to $S^*_O(t)$; thus, the optimal control of effluent quality and energy consumption for wastewater treatment process is realized.

Figure 2:
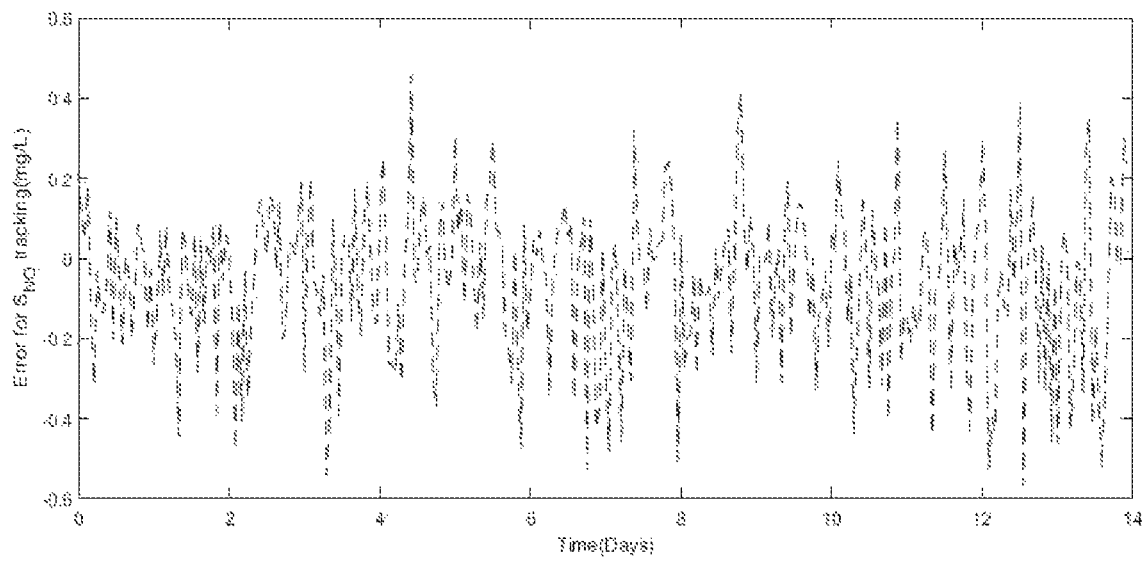
FIG. 2 is the nitrate nitrogen tracking error of the optimal control method.
Figure 3:
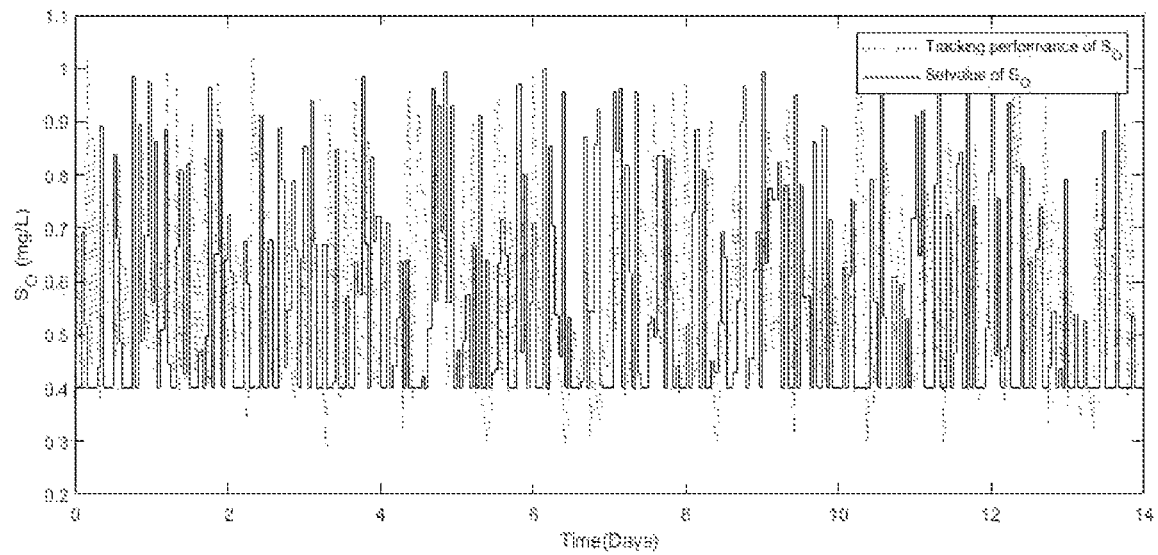
FIG. 3 is the dissolved oxygen result of the optimal control method.
Figure 4:
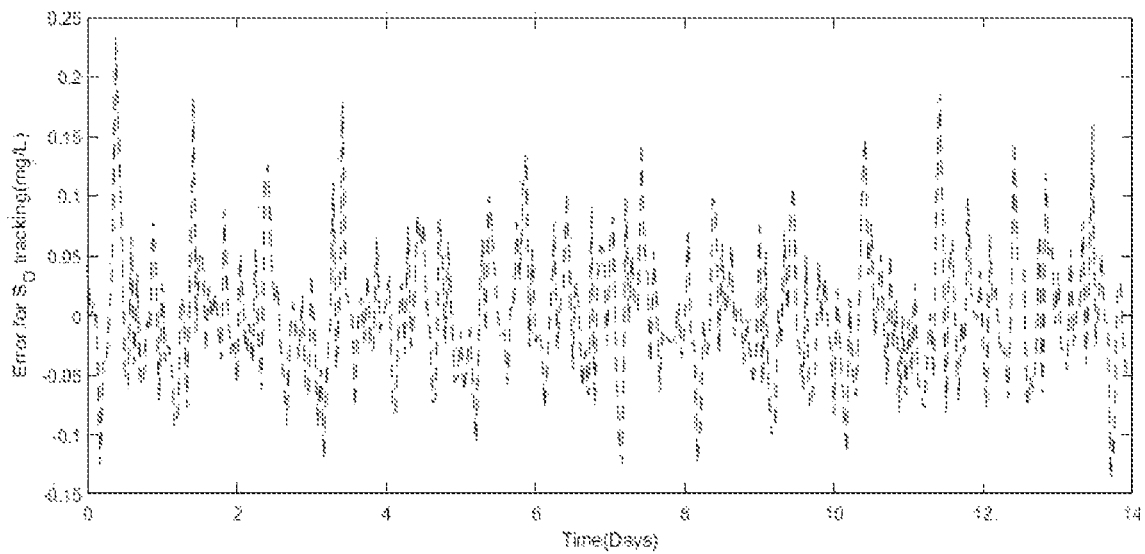
FIG. 4 is the dissolved oxygen tracking error of the optimal control method.

An optimal control system for wastewater treatment process based on self-adjusting multi-task particle swarm optimization algorithm outputs the concentrations of nitrate nitrogen and dissolved oxygen. FIG. 1 shows nitrate nitrogen results, where the solid line is the optimal set-point and the dotted line is the actual output value. X-axis: time, in days, Y-axis: nitrate nitrogen concentration, in mg/L. FIG. 2 is the nitrate nitrogen tracking error. X-axis: time, in days, Y-axis: nitrate nitrogen tracking error, in mg/L. FIG. 3 is the dissolved oxygen result, where the solid line is the optimal set-point and the dotted line is the actual output value. X-axis: time, in days, and Y-axis: dissolved oxygen concentration, in mg/L. FIG. 4 is the dissolved oxygen tracking error. X-axis: time, in days, Y-axis: dissolved oxygen tracking error, in mg/L.

What is claimed is:

1. An optimal control method for wastewater treatment process based on a self-adjusting multi-task particle swarm optimization algorithm, comprising the following steps:

(A) collecting, by a processor, process data: dissolved oxygen is an important indicator of a reaction nitrification process, which is mainly detected by detection instrument of dissolved oxygen; nitrate nitrogen determines a process of denitrification rate, which is mainly detected by detection instrument of nitrate nitrogen; and the process data will be transmitted to a programmable logic controller by fieldbus; the programmable logic controller converts a signal into digital or analog quantity and communicates with a master computer through a transmission protocol; the master computer obtains real-time data from the wastewater treatment process and stores the obtained real-time data in a Structured Query Language server database;

(B) designing, by the processor, a data-based multi-task optimization model for wastewater treatment process: the data-based multi-task optimization model for wastewater treatment process adopts a data-based method to describe relationship between optimization set-points and effluent quality, energy consumption, including an objective task model based on a kernel function and an auxiliary task model based on polynomial regression;

(i) establishing the objective task model of effluent quality and energy consumption based on a kernel function:

$$f_1(t) = B_1(t) + \sum_{z=1}^{10} W_{1,z}(t) H_{1,z}(t) \quad (1)$$

$$f_2(t) = B_2(t) + \sum_{z=1}^{10} W_{2,z}(t) H_{2,z}(t) \quad (2)$$

where $f_1(t)$ is the objective task model of effluent quality at time t, and $f_2(t)$ is the objective task model of energy consumption at time t; $B_1(t)$ is an output offset of $f_1(t)$ at time t, within [−2, 2], $B_2(t)$ is an output offset of $f_2(t)$ at time t, within [−2, 2]; $W_{1,z}(t)$ is a weight of zth kernel function of $f_1(t)$ at time t, within [−3, 3], $W_{2,z}(t)$ is a weight of zth kernel function of $f_2(t)$ at time t, within

[−3, 3]; $H_{1,z}(t)$ is kernel functions related to $f_1(t)$ for the wastewater treatment process, and $H_{2,z}(t)$ is kernel functions related to $f_2(t)$ for the wastewater treatment process:

$$H_{1,z}(t)=e^{-\|x(t)-c_{1,z}(t)\|^2/2s_{1,z}(t)^2} \quad (3)$$

$$H_{2,z}(t)=e^{-\|x(t)-c_{2,z}(t)\|^2/2s_{2,z}(t)^2} \quad (4)$$

where $x(t)=[S_{NO}(t), S_O(t)]$ is an input variable at time t, $S_{NO}(t)$ is anaerobic end nitrate nitrogen concentration by detection instrument of dissolved oxygen at time t, within [0, 2], unit: mg/L, and $S_O(t)$ is a concentration of dissolved oxygen at an aerobic terminal by detection instrument of nitrate nitrogen at time t, within [0, 3], unit: mg/L; T is transpose of a vector or a matrix;

$c_{1,z}(t)=[c_{1,z,1}(t), c_{1,z,2}(t)]^T$ is a center of zth kernel function of $f_1(t)$, and value ranges of $c_{1,z,1}(t)$ and $c_{1,z,2}(t)$ are [−1, 1], $c_{2,z}(t)=[c_{2,z,1}(t), c_{2,z,2}(t)]^T$ is a center of zth kernel function of $f_2(t)$, and value ranges of $c_{2,z,1}(t)$ and $c_{2,z,2}(t)$ are [−1,1]; $\sigma_{1,z}(t)$ is a width of the zth kernel function of $f_1(t)$ at time t, within [0, 2], $\sigma_{2,z}(t)$ is a width of the zth kernel function of $f_2(t)$ at time t, within [0, 2];

(ii) training parameters c(t), σ(t) and W(t) of the objective task model for wastewater treatment process:

$$c(t+1) = c(t) - \alpha_1 \frac{\partial e_{1u}(t)}{\partial c(t)} \quad (5)$$

$$\sigma(t+1) = \sigma(t) - \alpha_2 \frac{\partial e_{1u}(t)}{\partial \sigma(t)} \quad (6)$$

$$W(t+1) = W(t) - \alpha_3 \frac{\partial e_{1u}(t)}{\partial W(t)} \quad (7)$$

where $c(t)=[c_{1,z}(t), c_{2,z}(t)]$ is a center of a kernel function for the objective task model at time t, and $c(t+1)=[c_{1,z}(t+1), c_{2,z}(t+1)]$ is a center of the kernel function for the objective task model at time (t+1); $\sigma(t)=[\sigma_{1,z}(t), \sigma_{2,z}(t)]$ is a width of the kernel function for the objective task model at time t, and $\sigma(t+1)=[\sigma_{1,z}(t+1), \sigma_{2,z}(t+1)]$ is a width of the kernel function for the objective task model at time (t+1); $W(t)=[W_{1,z}(t), W_{2,z}(t)]$ is a weight of the kernel function for the objective task model at time t, and $W(t+1)=[W_{1,z}(t+1), W_{2,z}(t+1)]$ is a weight of the kernel function for the objective task model at time (t+1); $\alpha_1$ is a learning rate of a kernel function center for the objective task model within [0, 1], $\alpha_2$ is a learning rate of a kernel function width for the objective task model within [0, 1], $\alpha_3$ is a learning rate of the kernel function weight for the objective task model within [0, 1]; $e_{1u}(t)=y_1(t)-y_u(t)$ is a prediction error of the objective task model at time t, $y_1(t)=[f_1(t), f_2(t)]$ is an output of the objective task model at time t, $y_u(t)=[EQ(t), EC(t)]$ is an actual output value of wastewater treatment process at time t, EQ(t) is an actual effluent quality value of wastewater treatment process at time t, EC(t) is an actual energy consumption value of wastewater treatment process at time t;

(iii) establishing an auxiliary task model of effluent quality and energy consumption in wastewater treatment process based on the following polynomial regression:

$$f_3(t) = b_1(t) + \sum_{q=0}^{2} A_{1,q}(t)(x(t))^q \quad (8)$$

$$f_4(t) = b_2(t) + \sum_{q=0}^{2} A_{2,q}(t)(x(t))^q \quad (9)$$

where $f_3(t)$ is an auxiliary task model of effluent quality at time t, and $f_4(t)$ is an auxiliary task model of energy consumption at time t; $b_1(t)$ is an output offset of $f_3(t)$ at time t, within [−2, 2], $b_2(t)$ is an output offset of $f_4(t)$ at time t, within [−2, 2]; $A_{1,q}(t)$ is qth coefficient of $f_3(t)$ at time t, within [−3, 3], $A_{2,q}(t)$ is qth coefficient of $f_4(t)$ at time t, within [−3, 3];

(iv) training polynomial coefficient A (t) of an auxiliary task model for wastewater treatment process:

$$A(t+1) = A(t) - \alpha_4 \frac{\partial e_{2u}(t)}{\partial A(t)} \quad (10)$$

where $A(t)=[A_{1,q}(t), A_{2,q}(t)]$ is polynomial coefficient of the auxiliary task model for wastewater treatment process at time t, and $A(t+1)=[A_{1,q}(t+1), A_{2,q}(t+1)]$ is polynomial coefficient of the auxiliary task model for wastewater treatment process at time (t+1); $\alpha_4$ is a learning rate of polynomial coefficient for the auxiliary task model within [0, 1]; $e_{2u}(t)=y_2(t)-y_u(t)$ is a prediction error of the auxiliary task model at time t, and $y_2(t)=[f_3(t), f_4(t)]$ is an output of the auxiliary task model at time t;

(v) establishing multi-task optimization model for wastewater treatment process:

$$\text{minimize } F(t) = [F_1(t), F_2(t)] \quad (11)$$

$$\begin{cases} F_1(t) = [f_1(t), f_2(t)] \\ F_2(t) = [f_3(t), f_4(t)] \end{cases} \quad (12)$$

where, F(t) is the multi-task optimization model of wastewater treatment process at time t, $F_1(t)$ is the objective task model of wastewater treatment process at time t, and $F_2(t)$ is the auxiliary task model of wastewater treatment process at time t;

(C) solving, by the processor, optimal set-points based on self-adjusting multi-task particle swarm optimization embedded in the master computer: through knowledge transfer between an objective task and an auxiliary task, the self-adjusting multi-task particle swarm optimization algorithm achieves accelerated convergence of the objective task;

(i) setting total iteration times of self-adjusting multi-task particle swarm optimization as $\tau_{max}=500$, particle swarm size as N=100, the number of tasks as K=2, and initialize external archive U(0) as empty set;

(ii) an optimization objective of self-adjusting multi-task particle swarm optimization is the data-based multi-task optimization model for wastewater treatment process: min F(t)=[$F_1(t), F_2(t)$];

(iii) position information of particles $_i(\tau)=[S_{NOi}(t), S_{Oi}(t)]$ is used as input in τ iteration at time t; fitness and skill factors of particles are calculated, and particles are divided into different groups according to the skill factors; fitness ranking of the particles are carried out;

(iv) evaluating knowledge validity carried by particles:

$$E_t(\tau) = \frac{\sum_{m=1}^{20}(F_t^m(t) - \overline{F}_t(t))(g_t^m(t) - \overline{g}_t(t))}{s(F_t(t))s(g_t(t))} \quad (13)$$

where $E_t(\tau)$ is the knowledge validity of τth iteration at time t, $F^m_t(t)=[F^m_{1,t}(\tau), F^m_{2,t}(\tau)]$ is multi-task optimization fitness of mth particle in τiteration at time t, $F^m_{1,t}(\tau)$ is objective task fitness of the mth particle in τ iteration at time t, and $F^m_{2,t}(\tau)$ is auxiliary task fitness of the mth particle in τ iteration at time t; $\overline{F}_t(\tau)=[\overline{F}_{1,t}(\tau), \overline{F}_{2,t}(\tau)]$ is a mean of fitness for multi-task optimization in τ iteration at time t, $F_{2,t}(\tau)$ is a mean of fitness for the objective task in τ iteration at time t, $F_{2,t}(\tau)$ is a mean of fitness for the auxiliary task in τ iteration at time τ; $F_t(\tau)=[F_{1,t}(\tau), F_{2,t}(\tau)]$ is a fitness of multitask optimization in τ iteration at time t, $F_{1,t}(\tau)$ is a fitness of the objective task in τ iteration at time t, $F_{2,t}(\tau)$ is the fitness of the auxiliary task in t iteration at time t; $g_t(\tau)$ is the distance between an objective task particle and a global optimal particle of the auxiliary task in τ iteration at time t, $g^m_t(\tau)$ is a distance between mth objective task particle and the global optimal particle of the auxiliary task in r iteration at time t, $\overline{g}_t(\tau)$ is a mean distance between the objective particle and the global optimal particle of the auxiliary task in τ iteration at time t;

(v) designing knowledge transfer strategy:

$$p^*_{tg}(t) = \begin{cases} p_{tJ}(t) & E_t(t) \le E_t(t-1) \\ p_{tJ}(t-1) & E_t(t) > E_t(t-1) \end{cases} \quad (14)$$

where $P^*_{tg}(\tau)=[p^*_{tg,1}(\tau), p^*_{tg,2}(\tau)]$ is a knowledge transfer term in τ iteration at time t, $P_{tJ}(\tau)=[p_{tJ,1}(\tau), p_{tJ,2}(\tau)]$ is a global optimal solution of the auxiliary task in τ iteration at time t, $P_{tJ}(\tau-1)=[p_{tJ,1}(\tau-1), p_{tJ,2}(T-1)]$ is the global optimal solution of the auxiliary task in (τ−1) iteration at time t, and J is a solution with highest knowledge validity in a Pareto optimal solution set of the auxiliary task at time t:

$$J=\mathrm{argmin}_{j \in \{1,2,\ldots,M\}}\{E_{tj}(t)\} \quad (15)$$

where $E_{tj}(\tau)$ is the knowledge validity of Jth particle in the Pareto optimal solution set of the auxiliary task in t iteration at time t;

a particle velocity update formula:

$$v_{ti}(t+1)=wv_{ti}(t)+c_1r_1(p_{ti}(t))-x_{ti}(t)) +c_2r_2(P_{tg}(t)-x_{ti}(t))+ c_3r_3(p^*_{tg}(t)-x_{ti}(t)) \quad (16)$$

where $v_{ti}(\tau+1)$ is a velocity of ith particle in (τ+1) iteration at time t, and $v_{ti}(\tau)$ is the velocity of the ith particle in τ iteration at time t, $x_{ti}(\tau+1)$ is a position of the ith particle in (τ+1) iteration at time t, and $x_{ti}(\tau)$ is a position of the ith particle in τ iteration at time t, $P_{ti}(\tau)$ is an individual optimal position of the ith particle in τ iteration at time t, and $P_{tg}(\tau)$ is a global optimal position of the ith particle in τ iteration at time t, ω=0.8 is an inertia weight; $c_1=0.25$ is an individual experience acceleration constant, $c_2=0.25$ is a social experience acceleration constant, $c_3=0.25$ is a knowledge transfer term acceleration constant; $r_1$ is an individual experience random number within [0, 1], $r_2$ is a social experience random number within [0, 1], $r_3$ is a knowledge transfer item random number within [0, 1];

(vi) by comparing the individual optimal position $P_{ti}(\tau)$ with a solution of an archive $\Phi_t(\tau-1)$ in τ iteration at time t, the archive $\Phi_t(\tau)$ is updated:

$$\begin{cases} \Phi_t(\tau) = \Phi_t(\tau-1) \cup P_{ti}(\tau) & \text{if } F_1(\varphi_t(\tau-\iota)) \ldots F_1(P_{ti}(\tau)) \\ \Phi_t(\tau) = \Phi_t(\tau-1) & \text{else} \end{cases} \quad (17)$$

$$\iota = 1, 2, \ldots, t-1$$

where ∪ is logic relationship "union", $\Phi_t(\tau-1)=[\varphi_t-1)$, $\varphi_t(\tau-2), \varphi_t(\tau-t), \ldots, \varphi_t(1)]$, $\varphi_t(\tau-1)$ is ith optimal solution of archives in τ iteration, $F_1(\varphi_t(\tau-1))$ is an objective tasks fitness of $\varphi_t(\tau-1)$, $F_1(P_{ti}(\tau))$ is an objective tasks fitness of $P_{ti}(\tau)$;

(vii) judging whether to stop iteration: if current iteration number $\tau \ge \tau_{max}$, terminate the iteration process and go to step (viii); otherwise, the iteration number τ increases by 1 and go back to step (iii);

(viii) randomly selecting a solution from archives $\Phi_t(\tau_{max})$ as the optimal set-points at time t $u^*(t)=[S^*_{NO}(t), S^*_O(t)]$, where $S^*_{NO}(t)$ is an optimal set-point of nitrate nitrogen at time t and $S^*_O(t)$ is an optimal set-point of dissolved oxygen at time t;

(D) tracking, by the processor, control of the optimal set-points: a multivariable proportion integral differential controller is used to track and control the optimal set-points, and a control signal is transmitted to the programmable logic controller though Object Linking and Embedding for Process Control of communication; an analog signal is converted to a digital signal through an analog digital converter; the digital signal is transferred to a frequency converter by fieldbus, to control a frequency of an oxygen supply pump and a reflux pump, and realize optimal control of effluent water quality and energy consumption for wastewater treatment process;

(i) the multivariable proportion integral differential controller performs tracking control on the optimal set-points $S_{NO}(t)$ and $S_O(t)$:

$$\Delta u(t) = K_p\left[e(t) + H_l \int_0^t e(t)dt + H_d\frac{de(t)}{dt}\right] \quad (18)$$

where $\Delta u(t)=[\Delta Q_a(t), \Delta K_{La}(t)]^T$ is an operational variable matrix, $\Delta Q_a(t)$ is a change of a circulating flow, $\Delta K_{La}(t)$ is a change of an oxygen transfer coefficient; $K_p$ is a proportional coefficient, $H_l$ is an integral coefficient, $H_d$ is a differential coefficient; $e(t)=y^*(t)-y(t)$ is a control error at time t, $y^*(t)=[S^*_{NO}(t), S^*_O(t)]^T$ is the optimal set-points at time t, $y^*(t)=[S_{NO}(t), S^*_O(t)]^T$ is actual output values of $S_{NO}(t), S_O(t)$ at time t;

(ii) adjusting the oxygen transfer coefficient of the dissolved oxygen and an internal return flow:

$$K_La(t+1)=K_La(t)+\Delta K_La(t) \quad (19)$$

$$Q_a(t+1)=Q_a(t)+\Delta Q_a(t) \quad (20)$$

where $K_La(t+1)$ is the oxygen transfer coefficient of dissolved oxygen at time (t+1), $K_La(t)$ is the oxygen transfer coefficient of the dissolved oxygen at time t; $Q_a(t+1)$ is the internal return flow at time (t+1), $Q_a(t)$ is the internal return flow at time t; when the frequency of the oxygen supply pump and the reflux pump is adjusted by the frequency converter, a concentration of nitrate nitrogen will be adjusted to $S^*_{NO}(t)$ and the concentration of dissolved oxygen will be adjusted to $S^*_O(t)$; thus, the optimal control of effluent quality and energy consumption for wastewater treatment process is realized.

\* \* \* \* \*